No. 802,260. PATENTED OCT. 17, 1905.
L. S. BIXLER.
TOY.
APPLICATION FILED JAN. 28, 1905.

2 SHEETS—SHEET 1.

Witnesses
Franck L. Onrand.
Frank Y. Brereton

Inventor
Lewis S. Bixler
By Sturtevant & Greeby
Attorneys

No. 802,260. PATENTED OCT. 17, 1905.
L. S. BIXLER.
TOY.
APPLICATION FILED JAN. 28, 1905.

2 SHEETS—SHEET 2.

Fig. 2.ᵃ

Witnesses
Franck L. Ormand
Frank G. Brereton

Inventor
Lewis S. Bixler

Sturtevant & Gruby
Attorneys

UNITED STATES PATENT OFFICE.

LEWIS SHARPS BIXLER, OF FREEMANSBURG, PENNSYLVANIA, ASSIGNOR TO NATIONAL NOVELTY CORPORATION, OF NEW YORK, N. Y., A CORPORATION OF NEW YORK.

TOY.

No. 802,260. Specification of Letters Patent. Patented Oct. 17, 1905.

Application filed January 28, 1905. Serial No. 243,115.

*To all whom it may concern:*

Be it known that I, LEWIS SHARPS BIXLER, a citizen of the United States, residing at Freemansburg, in the county of Northampton, State of Pennsylvania, have invented certain new and useful Improvements in Toys, of which the following is a description, reference being had to the accompanying drawings, and to the letters of reference marked thereon.

My invention relates to an improvement in toys, and particularly to a mechanical wheeled toy in which the movement of a crank-axle imparts motion to the figure of an animal carrying a rider to give the representation of a bucking and kicking animal.

The invention consists in several features, among which may be mentioned the wire framework so constructed as to form bearings for the crank-wheel axle and also a support for the animal, as well as the base of the handle by which the toy may be manipulated.

Another feature also relates to the mode of pivoting the rider of the animal to said animal in combination with the pivoted animal itself and the means for operating the latter, whereby in the movement of the animal as it swings on its pivot it imparts automatically an up-and-down movement to the figure of the rider, giving the natural appearance of the animal trying to dismount the rider.

The invention is illustrated in the accompanying drawings, in which—

Figure 1:
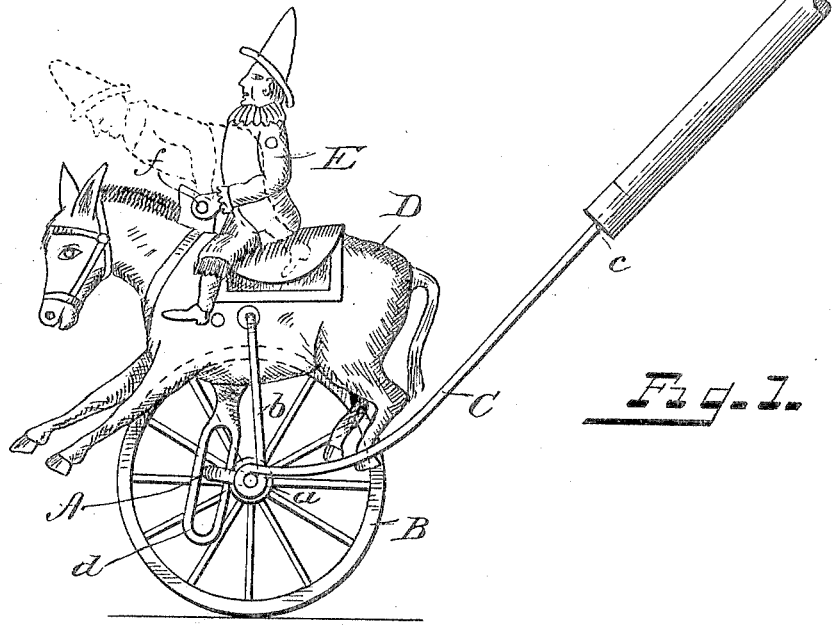
Figure 2:
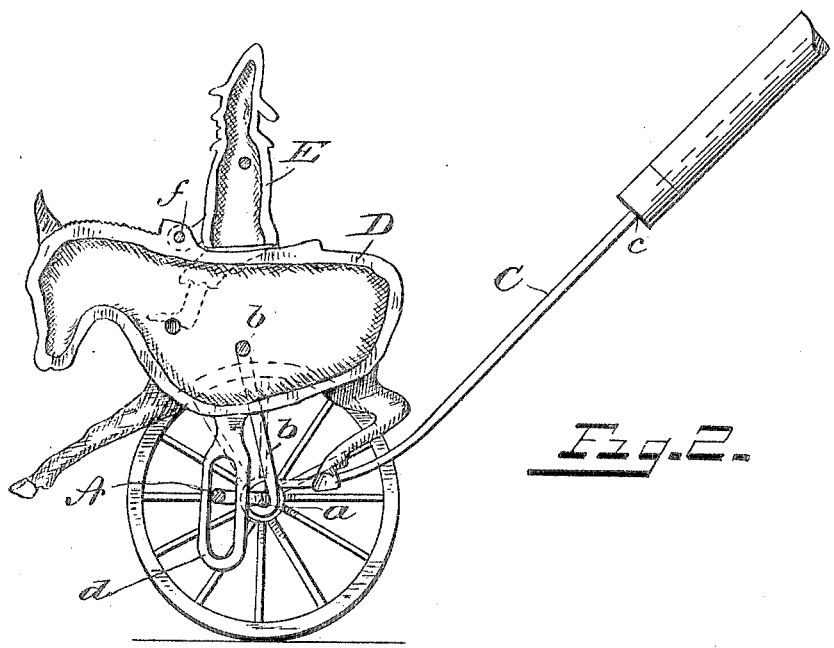

Figure 1 represents a side view of my improved toy. Fig. 2 represents a sectional elevation thereof. Fig. $2^a$ is a front elevation, and Fig. 3 a view similar to Fig. 1, of a modification.

In the drawings, A represents a crank-axle supporting suitable wheels B.

C represents as a whole the wire frame bent, as shown at $a$, to form bearings for the axle and having the upwardly-bent portion $b$ forming a yoke upon which the animal D is pivoted. At its rear end the parts of the wire frame are bent and the ends $c$ brought together to be attached to the handle.

Figure 3:
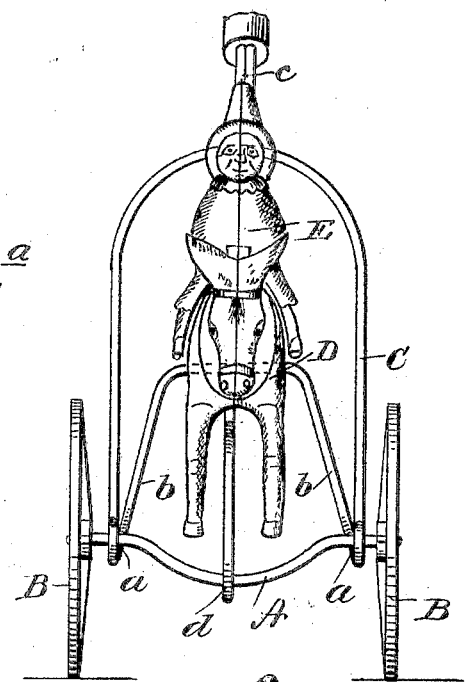
Figure 3:
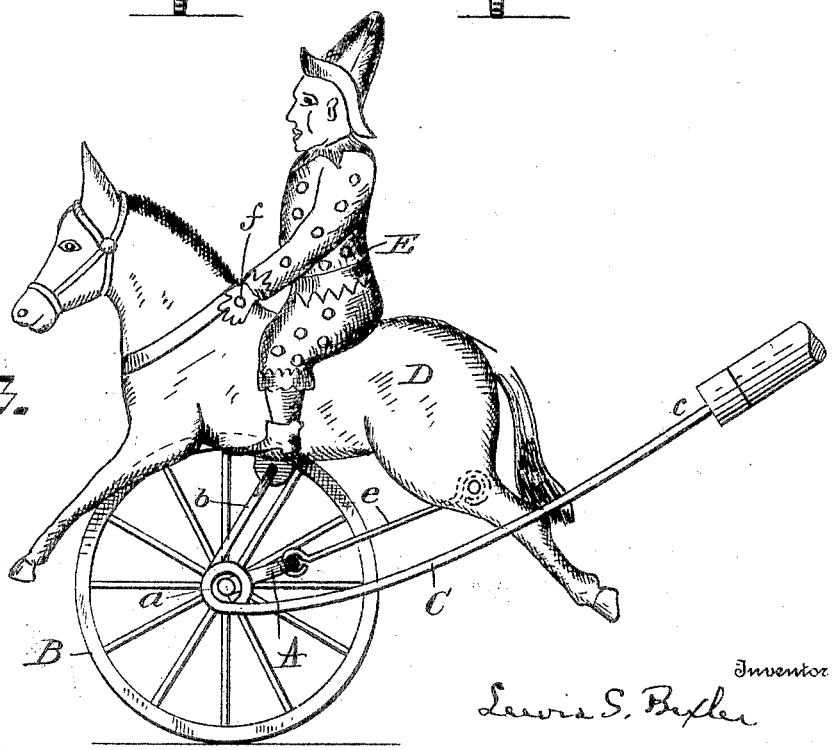

As shown in Fig. 1, the animal is cast in two pieces, one of which has a central slotted extension $d$ to engage the crank-axle, while in Fig. 3 the slotted extension is dispensed with, the crank-axle being connected to the rear portion of the animal by the rod or wire $e$.

The clown-rider E is cast in two pieces and mounted on the animal so as to pivot on the forward part of the animal, such as the mane, by means of a pivot-pin $f$, as shown.

The crank part of the axle through the slotted extension or the rod and wire gives an oscillating movement to the animal by reason of its being pivoted to the wire frame, and the rider being on a pivot forward of the center is made to swing automatically up and down, giving a natural appearance of an animal trying to dismount a rider.

Having thus described my invention, what I claim as new, and desire to secure by Letters Patent, is—

1. In an animal-figure toy of the character described, the combination with the crank-axle, of a wire framework bent to form bearings for the crank-axle, and bent to form a support, an animal-figure pivoted on said support with connections between the crank-axle and the said figure of the animal for swinging the latter on its pivot; substantially as described.

2. In an animal-figure toy of the character described, the combination with the crank-axle, of a wire framework bent to form bearings for the crank-axle, and bent to form a support, an animal-figure pivoted on said support with connections between the crank-axle and the said figure of the animal for swinging the latter on its pivot, and a representation of a rider loosely pivoted to the forward part of said animal; substantially as described.

In testimony whereof I affix my signature in presence of two witnesses.

LEWIS SHARPS BIXLER.

Witnesses:
GEORGE E. CRANE,
T. M. YOUNG.